(12) United States Patent
Schober et al.

(10) Patent No.: US 12,005,577 B2
(45) Date of Patent: Jun. 11, 2024

(54) ROBOT ASSEMBLY

(71) Applicant: KUKA Deutschland GmbH, Augsburg (DE)

(72) Inventors: Wolfgang Schober, Poettmes (DE); Moritz Zasche, Augsburg (DE); Andre Reekers, Augsburg (DE); Jorge Torres, Neusaess (DE); Martin Riedel, Augsburg (DE); Sabine Beck, Horgau (DE)

(73) Assignee: KUKA Deutschland GmbH (DE)

( * ) Notice: Subject to any disclaimer, the term of this patent is extended or adjusted under 35 U.S.C. 154(b) by 797 days.

(21) Appl. No.: 17/048,813

(22) PCT Filed: Apr. 16, 2019

(86) PCT No.: PCT/EP2019/059746
§ 371 (c)(1),
(2) Date: Oct. 19, 2020

(87) PCT Pub. No.: WO2019/201891
PCT Pub. Date: Oct. 24, 2019

(65) Prior Publication Data
US 2021/0146529 A1    May 20, 2021

(30) Foreign Application Priority Data

Apr. 19, 2018  (DE) ..................... 10 2018 206 009.6

(51) Int. Cl.
*B25J 9/16*    (2006.01)
*B25J 13/08*   (2006.01)

(52) U.S. Cl.
CPC ............. *B25J 9/161* (2013.01); *B25J 9/1633* (2013.01); *B25J 13/085* (2013.01); *G05B 2219/40304* (2013.01)

(58) Field of Classification Search
CPC ........ B25J 9/161; B25J 9/1633; B25J 13/085; G05B 2219/40304
See application file for complete search history.

(56) References Cited

U.S. PATENT DOCUMENTS

2001/0047226 A1* 11/2001 Saijo ...................... G06N 3/008
                                                      318/568.19
2008/0028883 A1*  2/2008 Inada ................... B25J 19/0091
                                                           901/19

(Continued)

FOREIGN PATENT DOCUMENTS

EP    0923011 A2   6/1999
EP    1072365 A1   1/2001
EP    1136193 A2   9/2001

OTHER PUBLICATIONS

European Patent Office; Search Report in related International Patent Application No. PCT/EP2019/059746 dated Sep. 23, 2019; 2 pages.

*Primary Examiner* — Kira Nguyen
(74) *Attorney, Agent, or Firm* — Dorton & Willis, LLP

(57) ABSTRACT

A robot assembly includes at least four load-bearing structural parts connected by joints between each two adjacent structural parts to form a chain, and a joint motor associated with each joint for the driven movement of the structural parts connected by the joint relative to each other. A control device is provided in one of the structural parts which is connected at both ends to an adjacent structural part via an associated joint. The control device is designed to control at least three of the joint motors, and the electrical connection of the control device to each of the joint motors necessary for the controlling process is provided by a separate control line dedicated to the associated joint motor.

14 Claims, 1 Drawing Sheet

(56) References Cited

U.S. PATENT DOCUMENTS

2016/0279800 A1\* 9/2016 Onda .................... B25J 9/1692
2016/0296293 A1\* 10/2016 Gill ....................... A61B 34/30
2017/0266807 A1\* 9/2017 Gombert ............... B25J 9/1617
2020/0093556 A1\* 3/2020 Zemlok ................. A61B 34/30

\* cited by examiner

ROBOT ASSEMBLY

CROSS-REFERENCE TO RELATED APPLICATIONS

This application is a national phase application under 35 U.S.C. § 371 of International Patent Application No. PCT/EP2019/059746, filed Apr. 16, 2019 (pending), which claims the benefit of priority to German Patent Application No. DE 10 10 2018 206 009.6, filed Apr. 19, 2018, the disclosures of which are incorporated by reference herein in their entirety.

TECHNICAL FIELD

The present invention relates to a robot arrangement.

BACKGROUND

A robot arrangement, for example an industrial robot, generally comprises a control apparatus designed to carry out a control program in order to control the robot arrangement and to output corresponding control commands in order to move a robot arm, for example, in the desired manner. In order to carry out the desired movement, the robot arm is typically equipped with a plurality of motors. A control device, which is usually arranged in a base of the robot arrangement, converts the control commands into control signals, for example certain electrical voltages or voltage pulses or pulse trains, in order to control the motors.

SUMMARY

The object of the present invention is to provide an improved robot arrangement, in particular to make at least part of the robot arrangement more compact.

This object is achieved by a robot arrangement having the features shown and described herein.

According to one aspect of the present invention, a robot arrangement comprises at least four supporting structural parts, the structural parts being connected by means of joints arranged between two adjacent structural parts in each case so as to form a chain as a whole, and an associated joint motor for each of the joints for the driven movement of the structural parts, which are connected by the particular joint, with respect to one another. A control device is arranged in one of the structural parts that is connected on either side to an adjacent structural part by means of a corresponding joint in each case, the control device being configured to control at least three of the joint motors and the electrical connection, which is required for the control, between the control device and each of the joint motors being formed by means of a separate control line, for example a control line cable, which is dedicatedly assigned to the particular joint motor.

The supporting structural parts, for example a carousel, a link arm or a single link of a robot arm or robot hand, can be oriented and/or positioned, for example with respect to a base of the robot arrangement, by the joints arranged therebetween in each case. The movements to be performed here can be initiated by the control device, in particular the central control device formed as an integrated circuit, for example, in which corresponding control signals are output by the control device for each individual joint motor via the control lines. By arranging the control device in one of the structural parts that is connected on either side to an adjacent structural part in each case by means of a corresponding joint, the number of control lines that have to be guided over or through the corresponding joints can be advantageously reduced for each of the joints in this case.

For example, it is possible to dispense with the process of guiding control lines over or through a first joint that defines a first robot axis and bears the remaining structural parts such that they can move with respect to a base of the robot arrangement. If the control device is arranged in a structural part behind a second robot axis, only the control line between the control device and the joint motor for the joint having the first robot axis thus has to be guided over or through a second joint that defines the second robot axis. Both the joint comprising the first robot axis and the joint comprising the second robot axis can therefore be designed in a particularly space-saving manner in terms of diameter and installation space. This concept may continue for joints that define additional robot axes such that, as a whole, the number of control lines guided over the corresponding joints can be advantageously reduced for the individual joints.

The inventive solution therefore allows for a more compact and/or slimmer design of the joints than in conventional robot arrangements that comprise a control device arranged in the base. In particular, the joints that define the main axes, i.e. the first and second robot axes, can be slimmer and more compact, and therefore the interference contour of the robot arrangement can be reduced, for example.

At the same time, positioning the control device, in particular the central control device, in one of the structural parts that is movable (with respect to the base) also allows for straightforward and quick mounting and/or maintenance of the robot arrangement, since the control electronics of the joint motors is preferably concentrated in a single component, in particular in an integrated circuit, for each of the joints of the robot arrangement. Therefore, potentially complex troubleshooting is dispensed with, for example.

Embodiments of the invention and developments thereof will be described in the following, each of which can be combined in any way desired, unless expressly ruled out.

In one exemplary embodiment, one of the at least four structural parts in which the control device is arranged is formed as a link arm of the robot arrangement. The link arm is preferably movably connected to a carousel of the robot arrangement by means of one of the joints and to a robot arm of the robot arrangement, in particular to a link of the robot arm, by means of another joint. As a result, the link arm supports at least the weight of the robot arm. Therefore, the link arm can dissipate heat given off by the control device as a result of its mass, which is in particular typically relatively high in comparison with links of a robot arm of the robot arrangement.

In this embodiment, the two joint motors for driving the movement of the link arm relative to the carousel or to the robot arm are preferably not installed in the link arm, but in particular in the carousel or in the robot arm. This advantageously prevents additional heat having to be dissipated from the joint motors by the link arm in addition to the heat from the control device. This makes dissipating the heat from the control device by means of the link arm particularly effective.

In another embodiment, a joint sensor system is assigned to each of the joints arranged between two adjacent structural parts in each case in order to record a joint state and to generate corresponding sensor signals. The control device is preferably designed to process the sensor signals. The electrical connection required to transmit the sensor signals from each of the joint sensor systems to the control device is preferably formed by means of a separate sensor line, for example a sensor line cable, which is dedicatedly assigned to the particular joint sensor system.

The joint sensor system preferably comprises a torque sensor, which is designed to record a torque acting on the corresponding joint and to output a corresponding torque signal. Alternatively or in addition, the joint sensor system comprises a resolver that is designed to record an angular position of the joint and to output a corresponding resolver signal. In this case, the evaluation electronics designed to evaluate these sensor signals is preferably integrated in a printed circuit board together with a control electronics for controlling the joint motors, which, in addition to saving production costs, also allows for particularly advantageous positioning inside the robot arrangement, specifically in one of the structural parts that is connected on either side to an adjacent structural part in each case by means of a corresponding joint. This can in particular simplify mounting and/or maintenance of the evaluation electronics together with the control electronics.

In another embodiment, the control device is designed to take the sensor signals into account when controlling the joint motors assigned to the joints. In particular, the control device can be designed to generate control signals for controlling the joint motors on the basis of the sensor signals generated by the joint sensor systems. This makes it possible to integrate the entire functionality of the robot arrangement in a single component, in particular in an integrated circuit that can advantageously be arranged in one of the structural parts that is connected on either side to an adjacent structural part in each case by means of a corresponding joint. Installation space that would otherwise have to be provided for the sensor electronics can thereby be saved.

In another embodiment, at least one of the joints is formed as a rocker joint and at least one of the separate control lines dedicatedly assigned to one joint motor and/or at least one of the sensor lines dedicatedly assigned to a joint sensor system is guided around the at least one joint, which is in the form of a rocker joint, by means of a loop. As a result, the control device can be reliably connected to each of the joint motors and/or joint sensor systems without the risk of damaging the respective control lines or sensor lines when the structural parts move relative to one another. In this case, guiding the control lines and/or sensor lines around the joint in the form of a loop by arranging the control device in one of the structural parts, which is connected on either side to an adjacent structural part in each case by means of a corresponding joint, is favored, since the number of control lines or sensor lines to be guided is reduced for each joint and therefore for example the rigidity of a resultant cable harness or the associated strain on the joint or joint motor is reduced.

In another embodiment, the structural part in which the control device is arranged comprises a structural cooling device for cooling the control device. The cooling device can in particular be designed to allow air to flow into the structural part in order to cool the control device. In this case, the cooling device is preferably designed such that, when the robot arrangement moves, in particular the structural part that is connected on either side to an adjacent structural part in each case by means of a corresponding joint and in which the control device is arranged, the air for cooling the control device flows into the structural part and/or is conducted to the control device. As a result, the control device can be cooled automatically.

The cooling device can comprise ventilation slots, for example, through which air automatically flows into the structural part when the structural part moves. The outer wall of the structural part preferably comprises at least one ventilation slot, preferably a plurality of ventilation slots, in particular in opposite or opposing regions of the outer wall. If the control device is arranged in the link arm of the robot arrangement, for example, the cooling device can be formed by a casing of the link arm having the corresponding ventilation slots. In this way, the control device can be cooled each time the link arm moves, possibly in addition to addition to other cooling mechanisms.

In another embodiment, the structural part in which the control device is arranged is formed as a shell. At least this structural part preferably comprises a skeleton-like structure, on or on top of which at least some components of the two joints that connect the structural part to an adjacent structural part in each case, the control device, the control lines, at least some components of the joint sensor systems assigned to the two joints, the sensor lines and/or the like are mounted. This skeleton-like structure is preferably covered by a casing (preferably in the form of an outer wall), which is releasably fastened to the skeleton-like structure and can optionally comprise ventilation slots for cooling the control device. In order to mount and/or maintain the control device that is preferably arranged directly beneath the casing, the casing can therefore be removed easily, thus making it possible to quickly mount and/or maintain the control device. In other words, the control device can be fastened to a shell or to the skeleton-like structure. The control device can preferably comprise at least one switching element, which is designed to interact with a complementary switching element in order to influence the behavior of the control device. For example, the control device can be fastened to the skeleton-like structure and can comprise at least one plug contact, one pushbutton or one switch preferably in the form of a switching element, wherein the shell that is fastened to the skeleton-like structure comprises a complementary switching element that, when the shell is arranged on the skeleton-like structure, actuates the switching element and thereby defines an adjustment by the control device, for example a maximum velocity, rotational speed, acceleration and/or motor current of the drive(s) controlled by the control device. As a result, the control device can advantageously be configured in a simple manner by changing the shells. It goes without saying that the control device can also be fastened to a shell and the complementary switching elements are fastened to the skeleton-like structure. As a result, when changing the shells, the control device can advantageously be automatically configured in accordance with the constraints owing to the skeleton-like structure or the robot.

In another embodiment, in addition to the control device, at least one additional electronic component, in particular an additional integrated circuit, is arranged in the structural part in which the control device is arranged. The at least one additional electronic component is preferably connected to the control device. In particular, the control device can be expanded by means of the at least one additional electronic component, for example with regard to its functionality. For example, the control device formed as a printed circuit board can be mounted in a region along one side of the skeleton-like structure of the structural part, additional electronic components being attached on an opposite side. Alternatively or in addition, the control device can be mounted in a region around the skeleton-like structure, additional electronic components being attached in additional regions along the skeleton-like structure. The therefore modular structure of the robot arrangement, in particular of the control device, allows for particular efficient use of the installation space inside the structural part in which the control device is arranged.

Therefore, in order to expand the functionality of the robot arrangement, additional sensor systems, for example, can be housed by the supporting structural part and connected to the control device can, for example in order to provide a "tactile skin" by means of which additional forces or torques not acting on the joints or joint motors can be recorded.

The control device is particularly advantageously arranged in the link arm of the robot arrangement and dimensioned with respect to the link arm such that sufficient installation space is offered for additional electronic components in the link arm. By additional electronic components being housed in the link arm instead of in links of a robot arm of the robot arrangement, for example, the mass and therefore the inertia of the robot arm is prevented from increasing, and therefore the strain on the joint between the link arm and the robot arm that defines a third robot axis and/or on additional joints that define additional robot axes can be minimized.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
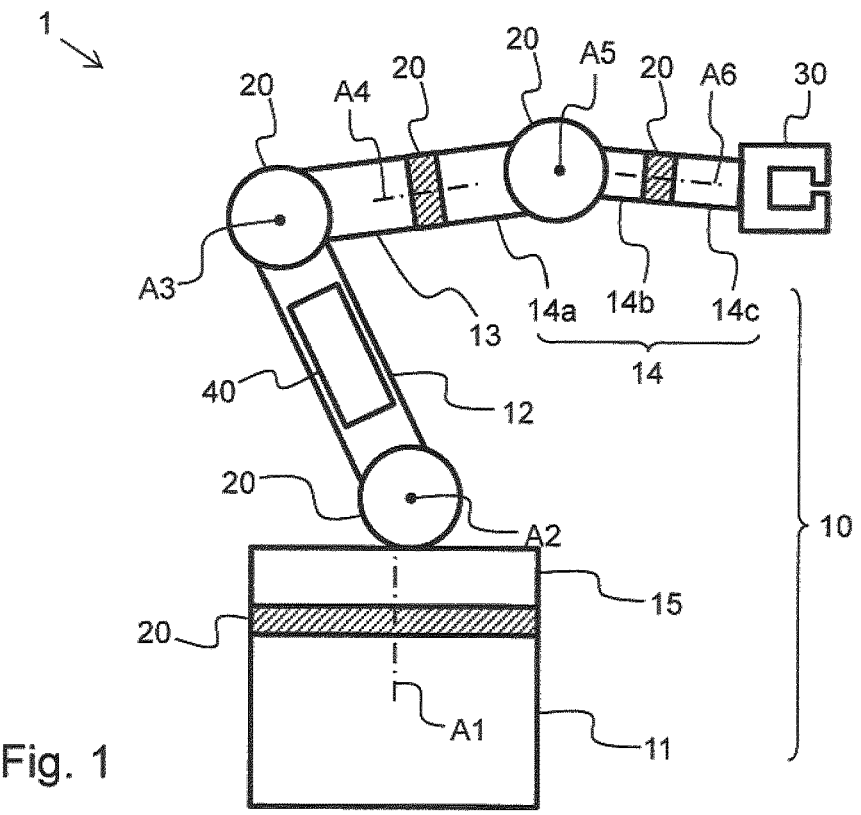
FIG. 1 is a partially schematic side view of a robot arrangement according to one embodiment of the present invention.

FIG. 1 is a side view of a robot arrangement 1 according to one embodiment of the present invention. The robot arrangement 1 comprises a plurality of supporting structural parts 10, each two adjacent structural parts 10 being movably connected to one another by means of at least one joint 20. In this case, the supporting structural parts 10 in particular form rigid connections between the joints 20. Joints 20, which allow the structural parts 10 connected to said joints to move about a robot axis A2, A3, A5 that is perpendicular to the image plane, are depicted by a circle. Joints 20, which allow the structural parts 10 connected to said joints to move about a robot axis A1, A4, A6 that lies in the image plane, are depicted by shading.

The supporting structural parts 10 can be formed in particular as a base 11, a link arm 12, a robot arm 13 and a carousel 15. The robot arm 13 supports a robot hand 14 comprising a plurality of links 14a-c, which can be connected to a tool 30. By means of the joint motors assigned to the joints 20 (see FIG. 2) the structural parts 10 can be moved independently of one another and therefore the tool 30 can be moved into a desired orientation or position. In this case, each of the joints 20 allows a structural part 10 to move relative to an adjacent structural part 10 about a robot axis A1-A6 defined by the joint 20.

At least three of the joint motors, preferably all of the joint motors of the robot arrangement 1, are advantageously controlled by a central control device 40. In order to forward the control signals generated in this case by the control device 40 to the joint motors, control lines (see FIG. 2) are provided, which extend through the structural parts 10 and connect the control device 40 to the particular joint motor.

The central control device 40 is preferably supported by one of the structural parts 10, which is connected on either side to an adjacent structural part 10 by a joint 20. As a result, the number of control lines that have to be guided around or through one of the joints 20 that connects the structural part 10 supporting the control device 40 to an adjacent structural part 10 can be advantageously reduced.

In the example shown, the control device 40 is arranged in the link arm 12, which is connected to the carousel 15 by a joint 20 and to the robot arm 13 by means of an additional joint 20. Therefore, only the control line between the control device 40 and the joint motor that is assigned to the joint 20 comprising the first robot axis A1 needs to be guided over or through the joint 20 on the second robot axis A2. By means of the joint 20 comprising the second robot axis A2, the control line between the control device 40 and the joint motor that is assigned to the joint 20 comprising the second robot axis A2, can additionally optionally be guided if the joint motor is arranged in or on the carousel 15. In contrast, the control lines between the control device 40 and the additional joint motors that are assigned to the joints 20 comprising the third to sixth robot axes A3-A6 do not extend over the joint 20 on the second robot axis A2. The joints 20 comprising the first and second robot axes A1, A2, which are also characterized as main axes, can therefore be slim and compact, which reduces the interference contour of the robot arrangement 1. In contrast, in a conventional arrangement (not shown) of the control device, in the base 11, each of these control lines has to be guided over the joint 20 comprising the first and second robot axis A1, A2 for this purpose.

Figure 2:
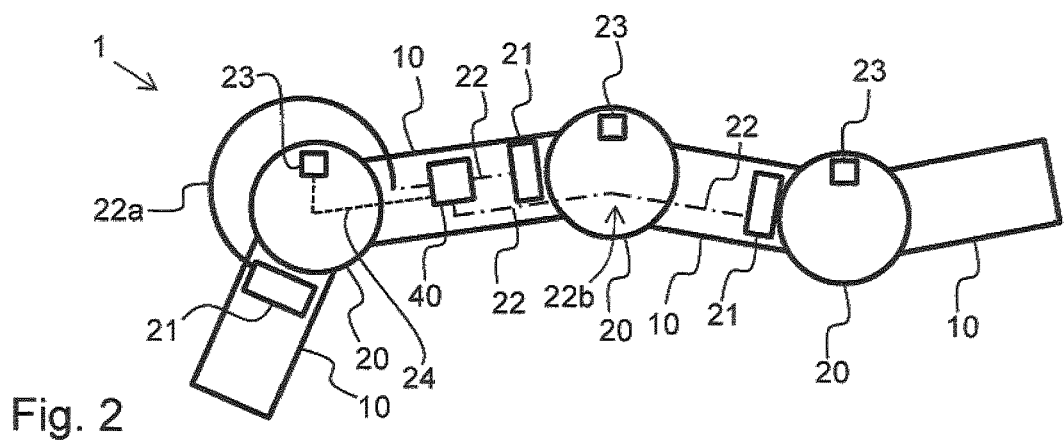
FIG. 2 is a partially schematic view of structural parts of a robot arrangement connected to form a chain, comprising a control device arranged in one of these structural parts.

FIG. 2 shows four structural parts 10 of a robot arrangement 1 connected by means of three joints 20 to form a chain, comprising a control device 40 arranged in one of these structural parts 10 for controlling joint motors 21 assigned to the joints 20. Each of the joint motors 21 is designed to drive the relative movement between two structural parts 10 connected by means of a joint 20.

In this case, each of the joint motors 21 is preferably arranged on one of the two structural parts 10, which are connected by means of the joint 20 to which the joint motor 21 is assigned. Each of the joint motors 21 is preferably arranged at one end of one of the two structural parts 10, which end faces the connecting joint 20. Alternatively, at least one of the joint motors can also be part of the corresponding joint 20 that is actuated by the movement driven by the joint motor, and can be arranged in the joint 20 or integrated in the joint 20 (not shown).

In the example shown, the joint motors 21 assigned to a joint 20 are each arranged at the end of the structural parts 10 that faces the relevant joint 20, which parts are connected to an adjacent structural part 10 by means of the relevant joint 20.

The control device 40 is connected to each of the joint motors 21 by means of a particular dedicated control line 22. In order to allow the control device 40 to also be connected to joint motors 21 that are not arranged in or on the structural part 10, in or on which part the control device 40 is also arranged, the control lines 22 are preferably guided around the joints 20 by means of loops 22a. Alternatively, the control lines 22 can, however, also be guided through a joint passage 22b extending through the particular joint 20.

Since the control device 40 is arranged in a structural part 10 that is connected on either side to an adjacent structural part 10 by means of a joint 20 in each case, i.e. it does not form one end of the chain, the number of control lines 22 guided via loops 22a or through joint passages 22b, in particular in the region of the two joints 20 that connect the structural part 10, in which the control device 40 is arranged, to adjacent structural parts 10, can advantageously be reduced.

In the example shown, only one control line 22 has to be guided around or through the two joints 20 that connect the structural part 10, in which the control apparatus 40 is arranged, to the two adjacent structural parts 10 in each case. If the control apparatus 40 were arranged in a structural part 10 that formed one end of the chain, at least two control lines 22 would have to be guided over or through the joint 20 that connects this structural part 10 to an adjacent structural part 10.

A joint sensor system 23 is assigned to each of the joints 20, each of the joint sensor systems 23 being connected to the control device 40 by means of a dedicated sensor line 24. For reasons of clarity, only one of the sensor lines 24 is depicted here. Each of the joint sensor systems 23 is designed to record a state of the particular joint 20, for example an angle of rotation of the joint or a torque acting on the joint 20, and to output corresponding sensor signals to the control device 40 by means of the particular sensor line 24. By means of the sensor signals, the control device 40 can control the joint motors 21 in a manner that is adapted to the situation, for example to prevent damage to components of the robot arrangement 1 in the event of a collision. Therefore, when recording a torque that is acting on one of the joints 20 and is characteristic of the collision, for example, a movement driven by the joint motors 21 can be stopped.

The sensor lines 24 are preferably guided in a similar manner to, in particular together with, the control lines 22 about or through the joints 20. The advantages of arranging the control device 40 in a structural part 10, which is connected on either side to adjacent structural parts 10 by means of two joints 20, in terms of reducing the number of control lines 22 guided over a joint 20 therefore also apply with respect to the sensor lines 24.

Figure 3:
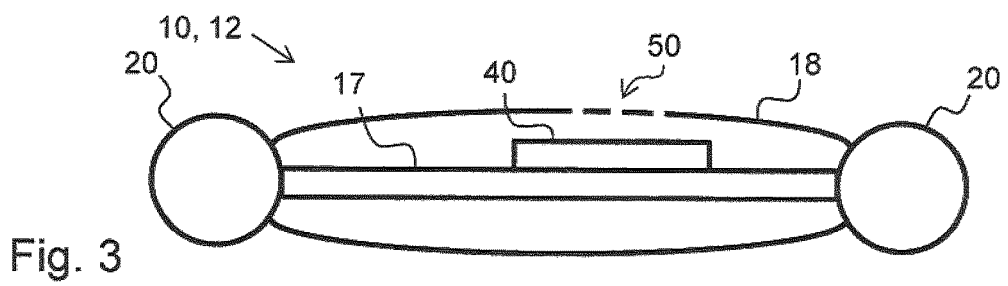
FIG. 3 is a partially schematic view of a structural part in the form of a link arm, in which a control apparatus for controlling joint motors is arranged.

FIG. 3 shows a structural part 10 formed as a link arm 12, in which a control apparatus 40 is arranged for controlling joint motors (see FIG. 2). The joint motors are assigned to joints 20 and are designed to drive movements of the link arm relative to adjacent structural parts (not shown), which are connected to the link arm 12 by means of the joints 20.

In the example shown, the link arm 12 is formed as a shell, i.e. it comprises a skeleton-like structure 17 that is formed from a metal support, for example and is covered by a cover 18 that is releasably connected to the skeleton-like structure 17. The control device 40 is mounted beneath the cover 18, for example on the skeleton-like structure 17. For maintenance purposes, the cover 18 can be easily removed such that the control device 40 is accessible.

A cooling device 50 is integrated in the cover 18 in the form of ventilation slots in order to cool the control device 40. The ventilation slots are made in a side of the cover 18 that is opposite the control device 40 such that, when the link arm 12 moves, air can flow through the ventilation slots and heat generated by the control device 40 can be transported away.

In addition, heat generated by the control device 40 can also be transported away via the skeleton-like structure 17, which for this purpose is preferably made of a material having good thermal conductivity. In this case, it is in particular advantageous for the joint motors assigned to the joints 20 not to be arranged in the link arm 12 but in the adjacent additional structural parts, which are connected to the link arm 12 by means of the joints 20, since the heat generated by the control device 40 and the heat generated by the joint motors therefore does not accumulate or the heat generated by the control device 40 cannot enter the joint motors, or vice versa.

The arrangement of the control device 40 in the link arm 12 is also advantageous since there is a sufficient amount of installation space here beneath the cover 18 in which additional electronic components (not shown), for example additional sensor systems, can be arranged in addition to the control device 40 and can be connected thereto.

Although embodiments have been illustrated in the above description by way of example, it should be noted that a variety of modifications are possible. It should also be noted that the embodiments given by way of example are merely examples that are in no way intended to restrict the scope of protection, the applications and the design. Instead, the above description will provide a person skilled in the art with a guideline for implementing at least one embodiment that is given by way of example, in which various modifications, in particular with respect to the function and arrangement of the component parts described, can be made without leaving the scope of protection as indicated in the claims and these equivalent combinations of features.

While the present invention has been illustrated by a description of various embodiments, and while these embodiments have been described in considerable detail, it is not intended to restrict or in any way limit the scope of the appended claims to such de-tail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

LIST OF REFERENCE SIGNS 1 robot arrangement
10 structural part
11 base
12 link arm
13 robot arm
14 robot hand
14a-d links
15 carousel
17 structure
18 casing
20 joint
21 joint motor
22 control line
22a loop
22b joint passage
23 joint sensor system
24 sensor line
30 tool
40 control device
50 cooling device
A1-A6 robot axes

What is claimed is:

1. A robot arrangement, comprising:
    at least four supporting structural parts, wherein the structural parts are connected to one another by joints arranged between two adjacent structural parts in each case so as to form a chain as a whole;
    a respective joint motor associated with each of the joints and configured for the driven movement of the structural parts that are connected by the particular joint with respect to one another;
    a control device arranged in one of the structural parts that is connected on either side to an adjacent structural part by a respective joint;
    wherein the control device is configured to control at least three of the joint motors; and
    a control electrical connection between the control device and each of the at least three controlled joint motors for the control, the control electrical connection comprising a separate control line that is dedicatedly assigned to each of the respective joint motors.

2. The robot arrangement of claim 1, wherein one of the at least four structural parts in which the control device is arranged is configured as a link arm.

3. The robot arrangement of claim 1, further comprising:
    a respective joint sensor system assigned to each of the joints arranged between two adjacent structural parts in each case, and configured to record a joint state and to generate corresponding sensor signals;
    wherein the control device is configured to process the sensor signals; and
    a sensor electrical connection configured to transmit the sensor signals from each of the joint sensor systems to the control device, the sensor electrical connection comprising a separate sensor line that is dedicatedly assigned to each of the respective joint sensor systems.

4. The robot arrangement of claim 3, wherein the control device is configured to take the sensor signals into account when controlling the joint motors assigned to the joints.

5. The robot arrangement of claim 3, wherein:
    at least one of the joints is formed as a rocker joint; and
    at least one of the separate control lines and/or at least one of the separate sensor lines is guided around the rocker joint by a loop.

6. The robot arrangement of claim 1, wherein the structural part in which the control device is arranged comprises a structural cooling device configured for cooling the control device.

7. The robot arrangement of claim 6, wherein the cooling device comprises at least one ventilation slot.

8. The robot arrangement of claim 7, wherein the at least one ventilation slot is arranged in an outer wall of the structural part.

9. The robot arrangement of claim 1, wherein the structural part in which the control device is arranged is configured as a shell.

10. The robot arrangement of claim 1, further comprising:
    at least one additional electronic component configured for at least one of processing or generating electrical signals and arranged in the structural part in which the control device is arranged;
    wherein the at least one additional electronic component is connected to the control device.

11. The robot arrangement of claim 10, wherein the at least one additional electronic component is configured for at least one of processing or generating additional sensor signals.

12. The robot arrangement of claim 1, wherein the control device comprises at least one switching element that is configured to interact with a complementary switching element in order to influence the behavior of the control device.

13. The robot arrangement of claim 12, wherein the control device is fastened to a skeleton-like structure, and a shell that can be fastened to the skeleton-like structure comprises a complementary switching element that actuates the at least one switching element when the shell is arranged on the skeleton-like structure.

14. The robot arrangement of claim 12, wherein:
    the control device is fastened to a shell that is in turn fastenable to a skeleton-like structure; and
    the skeleton-like structure comprises at least one complementary switching element that actuates the at least one switching element when the shell is arranged on the skeleton-like structure.

* * * * *